Sept. 6, 1966      HUGH L. DRYDEN      3,270,756
DEPUTY ADMINISTRATOR OF THE
NATIONAL AERONAUTICS AND
SPACE ADMINISTRATION
FLUID FLOW CONTROL VALVE
Filed April 9, 1963

SIEGFRIED HANSEN
INVENTOR.

BY
Howard B. Scheckman
ATTORNEYS

United States Patent Office 3,270,756
Patented Sept. 6, 1966

---

3,270,756
FLUID FLOW CONTROL VALVE
Hugh L. Dryden, Deputy Administrator of the National Aeronautics and Space Administration, with respect to an invention of Siegfried Hansen
Filed Apr. 9, 1963, Ser. No. 271,822
10 Claims. (Cl. 137—13)

The invention described herein may be manufactured and used by or for the Government of the United States of America for governmental purposes without the payment of any royalties thereon or therefor.

This invention relates to valves and more particularly to means for accurately controlling flow of a fluid in minute quantities.

Accurate control of flow of a fluid in the order of molecular quantities is more and more frequently being sought.

For example, there are many occasions when it is desirable to accurately control the flow of chemicals that are to be combined, or the flow of cesium vapor to an ionizer element in an ionic space propulsion engine.

An object of this invention is to provide a valve that can accurately control flow of a fluid in the order of molecules.

Another object of this invention is to provide a valve that can accurately control flow of a fluid in minute quantities, that is long-lived and easily maintained.

Figure 1:
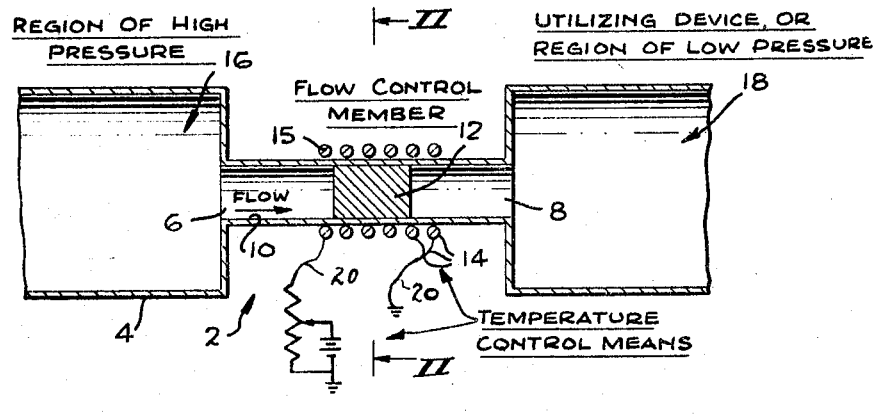
Figure 2:
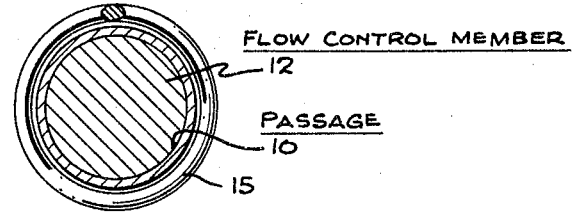

Other objects and advantages will appear from the specifications and claims taken in connection with the drawings wherein:

FIG. 1 is a view of an embodiment of the invention showing the valve structure; and FIG. 2 is a sectional view of FIG. 1 taken in the direction of arrows II—II showing the temperature control means in relation to the flow control member, and connecting passage.

In general this invention teaches making a valve with a flow control member, positioned in the path of flow of a selected fluid as it flows through the valve. The flow control member is constructed of a material such as zeolite or activated alumina. This material is used to control the flow of molecules for the reasons that are explained below. The valve does not contain any moving parts, the flow control member being fixed in position.

It is well known that certain minerals, as for example, zeolite or activated alumina, can be used as a "molecular sieve." That is, the crystal of these minerals will permit one size molecule to enter the crystal but will prevent larger size molecules from doing the same. See for example the article titled "Molecular Sieves" by D. W. Breck and J. V. Smith in the January 1959 Scientific American, pages 85 through 94.

As noted in the above article, and as a matter of background, the structure of most crystals extends uniformly in all directions without leaving empty spaces. In certain substances, as for example zeolite, the structure is honeycombed with relatively large cavities. The shape and size of the cavities depends on the variety of zeolite.

For example, in chabazite, one of the commonest zeolites, elements are so connected together that they partially enclose a roughly football-shaped cavity whose longest diameter is about 11 angstrom units. Each cavity in turn connects with six adjacent cavities through apertures about 3.9 angstroms in diameter. A cubic inch of chabazite contains about $5 \times 10^{21}$ cavities.

In effect these minerals structurally resemble a "jungle gym." Small molecules can easily pass through the crystal, while larger molecules cannot pass, or can do so only with difficulty.

The "mesh" of a zeolite sieve depends on the diameter of the apertures connecting the cavities. For example, apertures of one sodium-bearing type of zeolite have diameters of 3.5 angstroms, while those of another calcium-bearing type have diameters of 4.2 angstroms.

Actually, molecules having slightly larger diameters than the apertures can still enter the apertures and pass through the crystal. The reason is that the atoms of the crystal pulsate. Pulsations of both aperture atoms and incoming molecules combine to make the effective diameter of the aperture considerably larger than its "actual" diameter. Moreover, kinetic energy of incoming molecules helps them to "shoulder their way" through the aperture.

It has been found in general that at ordinary temperatures, molecules up to .5 of an angstrom wider than the "actual" diameter of the aperture can easily pass through the crystal. Larger molecules enter the crystal with greater and greater difficulty; and molecules one angstrom wider cannot enter at all.

The article also discloses that changing the temperature of the crystal can be used to give precise control over its sieving or separation properties. The reason for the above, is that when the temperature is lowered the vibrations of the crystal's atoms are damped. This shrinks the effective diameter of the apertures to near their "actual" diameter. Also, the cold cuts down on the kinetic energy of the fluid molecules trying to enter the apertures.

As an example of how temperature can control the "mesh" of a zeolite, a nitrogen molecule can enter the crystal of one type of zeolite of 0° C., but at −150 degrees C. it cannot enter because the ions in the crystal have partially blocked the cavity.

As indicated by the above article, and until this invention, this class of minerals had been used as a sieve or "go, no-go" device to separate various fluids. That is, the crystal was selected and designed so molecules of one size would "pass" or "not pass" into the crystal and be absorbed to separate them from other size molecules.

According to this invention zeolite or activated alumina is chosen because it contains cavities in its crystal structure whose aperture diameters can be made to vary in response to temperature. The apertures' diameter can be made large enough so molecules of a selected fluid pass easily at a first temperature or small enough to prevent passage of said molecules at a second temperature.

In line with the above, it is pointed out that the impedance of the flow control member, or its resistance to passage of molecules, does not change abruptly from "go" to "no-go" at a single temperature point. It gradually changes through a temperature range.

At the high or "go" temperature, the molecules will pass very easily through the flow control member. At the "no-go" temperature they will not pass at all.

Adjusting the temperature of the crystal between these two temperature extremes changes the effective dimensions of the apertures' diameters. This in turn varies the impedance of the flow control member to the flow of molecules of the selected fluid. Passage of the molecules is therefore accurately controlled within this temperature range.

It is noted that the flow control member operates as a valve for molecules of a selected fluid. The control member does not separate different fluids, it does not operate as a sieve.

Referring to the drawings, there is disclosed an embodiment of the invention. The valve is indicated by arrow 2. It includes housing 4 having: fluid inlet portion 6; fluid outlet portion 8; passage 10 connecting said portions 6 and 8; flow control member 12, positioned in passage 10 in the path of flow between portions 6 and 8, to block the path of flow; and means 14 for controlling the temperature of the flow control member.

Inlet portion 6 may be connected to a reservoir of high pressure fluid 16, and outlet portion 8 to a utilizing device 18 or a region of low pressure fluid.

With respect to flow control member 12, it is made in the form of a plug preferably of a large single crystal of a mineral having the characteristics of zeolite or activated alumina. The crystal plug is manufactured to fit tightly in connecting passage 10 so it will retain its position and prevent leakage between the plug and wall.

As a side note, it is pointed out that while a crystal may become "saturated" it can still pass fluid. This is like a pipe, for example, that may be "saturated with fluid," but the fluid still passes through the pipe.

Means 14, for controlling the temperature of the plug, may take the form of an element 15 of coil shape, positioned to surround flow control member 12 and connecting members 20, 20 to interconnect the element 15 to a control member. This control member is constructed to regulate the temperature of element 15 as is well known in the art.

The control member operates to provide an infinite gradation of temperature of the crystal. In the drawings the control member is depicted as a potentiometer. However, it will be apparent to one skilled in the art that other means may be used to accurately change the temperature of the crystal. As the control member changes the temperature of the crystal, so will it change the crystal's impedance, thus providing increasing or decreasing resistance to the passage of the molecule through the crystal. This provides means to accurately regulate the flow of the selected molecules through the crystal.

It is pointed out that the prior art does not teach using a crystal to regulate movement of a molecule after it has passed into the crystal. In the prior art, once a molecule enters the crystal, the crystal has performed its function. This invention teaches how to regulate the passage of a molecule through the crystal—after the molecule has entered the crystal.

It is noted that valve 2 does not have any moving parts. It is therefore extremely simple to fabricate, easy to maintain, and will as a result have a long life.

It is also noted that mineralogists have distinguished some 40 varieties of natural zeolites. In addition zeolites can be synthesized in a variety of forms. By choosing appropriate species, matching their ionic content to the needs of a particular valving problem and juggling the temperature of operation, apertures can be adjusted to suit the requirements of the specific fluid being controlled.

Although but a single embodiment of the present invention has been illustrated and described, it will be apparent to one skilled in the art that various changes and modifications may be made therein without departing from the invention as defined in the appended claims.

What is claimed is:

1. In a valve, the combination comprising: a flow control member positioned to block the path of flow of a selected fluid through said valve, said member being constructed of material whose crystal structure contains apertures through which molecules of said selected fluid can flow, and whose aperture size varies in response to temperature change; and means to change the temperature of said flow control member to change the size of said apertures to vary the impedance of said flow control member to the flow of molecules of said selected fluid through said apertures.

2. A device as set forth in claim 1 wherein said material of which said flow control member is constructed is zeolite.

3. In a valve, the combination comprising: a housing, said housing including a fluid inlet portion, a fluid outlet portion, and a passage interconnecting said portions; a flow control member positioned in said passage to block the path of flow of a selected fluid through said valve, said flow control member being constructed of material whose crystal structure contains apertures whose effective diameters vary in response to temperature change; and means cooperating with said flow control member to vary its temperature to change the effective diameters of said apertures to control the flow of molecules of said selected fluid through said apertures.

4. A device as set forth in claim 3 wherein said flow control member is fixed in said passage interconnecting said inlet and outlet portions.

5. A device as set forth in claim 3 wherein said material of which said flow control member is constructed is zeolite.

6. In a valve, the combination comprising: a flow control member positioned in the path of flow of a selected fluid through said valve, said control member being constructed of material containing cavities in its crystal structure whose effective aperture diameters vary in response to changes in temperature, said effective aperture diameters being large enough to pass molecules of said selected fluid at a first temperature and small enough to prevent passage of said molecules at a second temperature; and means to vary the temperature of said flow control member between said two temperatures to vary said flow control member's impedance to flow of said molecules therethrough.

7. A method of controlling molecular flow of a selected fluid, comprising the steps of: making a flow control member of material whose crystal structure contains apertures through which molecules of said selected fluid can flow, and whose aperture size varies in response to temperature change; positioning said flow-control member to block the path of flow of said selected fluid; and, regulating the temperature of said flow control member to change the size of said apertures to vary the impedance of said flow control member to control the flow of molecules of said selected fluid moving through said apertures in said material.

8. A method of controlling molecular flow of a selected fluid comprising the steps of: making a flow control member of zeolite, which contains apertures in its crystal structure and whose apertures diameters vary in response to temperature change; positioning said flow control member to block the path of flow of said selected fluid; and, regulating the temperature of said flow control member to control the flow of molecules of said selected fluid moving through said material.

9. A method of controlling molecular flow of a selected fluid, comprising the steps of: making a flow control member of material chosen to contain cavities in its crystal structure and whose cavity aperture diameters vary in response to temperature, said aperture diameters being large enough to pass molecules of said selected fluid at a first temperature and small enough to prevent passage of said molecules at a second temperature; positioning said flow control member in the path of flow of said selected fluid; and regulating the temperature of said flow control member between said two temperatures to vary said flow control member's impedance to flow of said molecules moving through said material.

10. A valve for controlling the molecular flow of a selected fluid comprising: a valve body including a flow passage therethrough, said passage having an inlet in communication with a supply of said fluid in a zone of relatively high pressure and having an outlet end communicating with a zone of relatively low pressure; a flow control plug tightly fitted in said passage and composed of a material having a multiplicity of molecular flow paths therethrough; the effective diameters of said flow paths at a selected low temperature being so small as to prevent passage of molecules of said selected fluid, and being large enough at a selected higher temperature to pass said molecules; and means to vary the temperature of said plug to vary the effective diameters of said flow paths to vary the impedance of said plug to the flow of molecules of said selected fluid.

References Cited by the Examiner
UNITED STATES PATENTS 2,909,919   10/1959   Meyer _____ 137—599 X
3,001,607   9/1961    Eng _____ 55—75 X

OTHER REFERENCES

"Molecular Sieves," by D. W. Breck and J. V. Smith, Scientific American, January 1959, vol. 200, No. 1, pages 85–94.

WILLIAM F. O'DEA, *Primary Examiner.*

D. ZOBKIW, *Assistant Examiner.*